United States Patent [19]

Blanquet et al.

[11] Patent Number: 4,774,262
[45] Date of Patent: Sep. 27, 1988

[54] APPLICATION OF DIPHOSPHONIC DERIVATIVES TO CATION EXCHANGE, NEW DIPHOSPHONIC DERIVATIVES, AND PRODUCTION PROCESS THEREFOR

[75] Inventors: Pierre Blanquet, Rambouillet; Francois Ricalens, Paris, both of France

[73] Assignees: Minemet Recherche, Trappes; Societe Nationale des Poudres et Explosifs, Paris, both of France

[21] Appl. No.: 802,472

[22] Filed: Nov. 27, 1985

Related U.S. Application Data

[63] Continuation of Ser. No. 256,141, Apr. 21, 1981, abandoned.

[30] Foreign Application Priority Data

Apr. 27, 1980 [FR] France ................... 80 08963

[51] Int. Cl.$^4$ .................. C08D 5/20; C08C 19/24
[52] U.S. Cl. .................... 521/31; 525/340; 521/25; 521/38
[58] Field of Search ............... 525/340; 558/158, 164; 521/25, 30, 31; 423/9, 21.5; 252/184

[56] References Cited

U.S. PATENT DOCUMENTS

| | | | |
|---|---|---|---|
| 3,214,454 | 10/1965 | Blaser et al. | 556/18 |
| 3,297,578 | 1/1967 | Crutchfield et al. | 252/99 |
| 3,303,139 | 2/1967 | Blaswer et al. | 252/180 |
| 3,784,512 | 1/1974 | Masson et al. | 524/123 |
| 3,890,228 | 6/1975 | Hwa et al. | 210/699 |
| 4,020,091 | 4/1977 | Budnick | 524/123 |

FOREIGN PATENT DOCUMENTS

| | | |
|---|---|---|
| 0001561 | 5/1978 | European Pat. Off. |
| 0023173 | 1/1981 | European Pat. Off. |
| 1002355 | 2/1957 | Fed. Rep. of Germany ...... 260/932 |
| 1171401 | 6/1964 | Fed. Rep. of Germany ...... 260/932 |
| 2322100 | 4/1977 | France |
| 537086 | 11/1976 | U.S.S.R. .................. 521/31 |
| 724528 | 3/1980 | U.S.S.R. .................. 521/31 |
| 810642 | 3/1959 | United Kingdom ............. 260/932 |

OTHER PUBLICATIONS

Chem. Abstacts, vol. 95, entry 158798N.
Chem. Abstracts, vol. 95, "Phosphonic Acid-bis Derivatives".

Primary Examiner—Joseph L. Schofer
Assistant Examiner—Peter F. Kulkosky
Attorney, Agent, or Firm—Fleit, Jacobson, Cohn & Price

[57] ABSTRACT

A water insoluble ion exchange resin having a crosslinked, three dimensional resin skeleton and an active group of the formula:

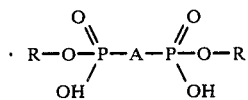

wherein R is selected from the group consisting of hydrogen and an alkyl radical having 1-15 carbon atoms and having at most two branchings in the alkyl group, and A is a mono-, di-, or tri-substituted ethylene radical or mono- or di-substituted methylene radical, wherein the substituents are selected from the group consisting of an alkyl group having at most two branchings, hydroxy, an amino group and hydrogen and wherein A provides a link binding the active group to the resin skeleton.

9 Claims, No Drawings

APPLICATION OF DIPHOSPHONIC DERIVATIVES TO CATION EXCHANGE, NEW DIPHOSPHONIC DERIVATIVES, AND PRODUCTION PROCESS THEREFOR

This is a continuation of application Ser. No. 256,141 filed Apr. 21, 1981, now abandoned.

The present invention relates to the application of diphosphonic derivatives to cation exchange, new diphosphonic derivatives and a process for their manufacture.

In recent years, the recovery of metal ions and the purification of aqueous solutions have relied increasingly on ion exchangers in the form of resins or in the form of agents for liquid-liquid extraction.

There are many extractant compositions on the market at the present time. However, these compositions do not make it possible to exchange certain metal cations when the latter are dissolved in highly acidic and/or strongly complexing aqueous solutions.

One of the most difficult problems to deal with is the recovery of actinides and of certain rare earths present in phosphoric acid solutions, and more especially the recovery of uranium present in solutions of crude phosphoric acid whose $P_2O_5$ content varies from 10 to 50% by weight.

This is why one of the objectives of the present invention is to provide an extractant composition capable of extracting certain metal cations present in certain complexing or highly acidic media.

Another objective is to provide a composition of the above type which is capable of extracting uranium in phosphoric acid with a $P_2O_5$ content varying from 10 to 50%.

Lastly, another objective is to provide a process for the recovery of uranium by cation exchange in the above phosphoric medium, by making use of the said compositions, with the temperature being capable of varying from ambient temperature to 70°–80° C.

These objectives are attained by means of the application to cation exchange of diphosphonic derivatives whose acid form is represented by the following general formula G:

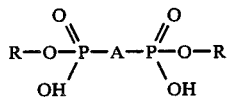

where R is chosen from the group consisting of alkyl residues containing 1 to 15 carbon atoms and at most two branchings of the main chain and of hydrogen, or A is a divalent organic radical chosen from the group of mono-, di-, or trisubstituted ethylenes and of mono- or disubstituted methylenes.

Among the active diphosphonic groups, it is appropriate to mention a group which has the merit of having excellent extractant capacity and which is readily available at the same time. This is the diphosphonic hydroxymethylene group.

Another group which is also readily available is the diphosphonic aminomethylene group.

However, although it is more difficult to synthesize, the diphosphonic methylene group appears to be that having the best chemical stability with excellent extraction characteristics.

The derivatives according to the present invention can be liquid-liquid extraction agents in which the total number of carbon atoms is from 7 to 50, and which are, if appropriate, diluted in a hydrocarbon diluent chosen from the group of aliphatic and aromatic saturated and unsaturated hydrocarbons and their mixtures.

The total number of carbon atoms in these derivatives is preferably between 15 and 40, the most satisfactory range being between 18 and 30.

As the examples demonstrate, the extractant properties of these derivatives can vary appreciably depending on the characteristics of the hydrocarbon chains A or R. Thus, a highly branched chain and/or a chain including cyclane or bicyclane compounds endows the compounds produced by the synthesis with a much lower lipophilicity than that conferred by the straight chains containing the same number of carbon atoms. However, it does not constitute a departure from the invention to consider that when there is a cyclane in a chain, the chain is equivalent to a straight chain or the cyclane counts as one-half of the carbon atoms which it contains.

A comparison can be made with the hydroxydiphosphonated compounds obtained by the action (described hereinafter) of phosphorus trichloride on naphthenic acid which in principle contains 23 carbon atoms and is highly branched, on the one hand, and on the products derived from papermaking residue known by the name, Scandinavian in origin, "tall oil" and which is a mixture of oleic and linoleic acids, acids whose straight chains have 18 carbon atoms and which respectively contain single and double unsaturation, on the other hand. In the first case, the solubility of the diphosphonic derivative in water is very high, which makes its use very costly. In the second case, solubility in the aqueous phase is extremely low, less than 1/3,000th. The symmetrical or disymmetrical diesterification plays a very important double part; it considerably reduces the water-solubility of the acids obtained in this manner, and it leads to a very great increase in the selectivity for the extraction of uranium relative to iron in phosphoric media.

Taking the above, and economic data, into consideration, it is possible to define a product of low-cost synthesis and having excellent extraction qualities. Such a product is derived from a straight-chain fatty acid which has been subjected to a diphosphonation by means of phosphorus trichloride and which has been subjected to a diesterification. The product thus obtained should have a radical A containing at least 8, and preferably between 15 and 25, carbon atoms and having at most two branchings and preferably none, the radical R containing from 1 to 15, preferably from 8 to 12, carbon atoms and having at most two branchings.

These products offer the remarkable advantage, which was not offered by any other product for the extraction of uranium in the tetravalent oxidation state present in phosphoric acid, of being insoluble in a basic medium, which permits a reextraction by means of solutions of an alkali metal or ammonium carbonate and of an oxidizing agent permitting the uranium to change from tetravalency to hexavalency.

The compounds according to the invention can also be ion exchange resins in which the active groups correspond to the formula G.

Another objective of the present invention is to provide new diphosphonic derivatives of formula G', which correspond to the general formula G where A corresponds to the formula:

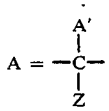

where R is chosen from the group consisting of the hydrogen atom and the hydrocarbon residues with 1 to 15 carbon atoms, where A' is chosen from the group consisting of the hydrocarbon radicals containing from 1 to 30 carbon atoms and at most two branchings, of the side chains of a resin containing other side chains bearing groups of the G' type and containing an amount of phosphorus of at least 5%, where Z is chosen from the group consisting of hydrocarbon radicals containing from 1 to 30 carbon atoms and at most two branchings, of amino (un-, mono- or disubstituted $NH_2$) groups, of alcohol (un- or substituted OH) groups and of the hydrogen atom.

The radical R in the formula G preferably containing from 8 to 12 carbon atoms and having at most two branchings.

The total number of carbon atoms being advantatageously between 10 and 50, preferably between 15 and 40, the most satisfactory range being between 18 and 30.

Compared to the known phosphorus derivatives which are capable of extracting uranium, such as OPPA, the derivatives according to the invention offer the novel feature of having their lipophilic nature linked to the length of a chain attached directly to the phosphorus by carbon-phosphorus bonds and situated between the two phosphorus atoms. This is why the constraints relating to the group A are the most exacting, that is to say they should advantageously have at least eight, and preferably between 15 and 25, carbon atoms. In addition, these derivatives have the advantage of offering high stability to acid reactants, especially hydrofluoric acid.

Lastly, it should be remarked that when Z is hydrophilic, that is to say when it is an amino or hydroxyl group, and when this is not compensated by a loss in hydrophilicity due to partial esterification of the phosphonic acid groups, it is necessary that the group A' is (sic) at least 14 carbon atoms, to obtain to obtain (sic) a satisfactory lipophilicity.

With regard to the new derivatives constituted by the ion exchange resins according to the invention, they are preferably the derivatives wherein the resin is chosen form the group consisting of acrylic resins and crosslinked polystryrenes.

The weight proportion of phosphorous in the resin is preferably between 10 and 25%.

An additional objective of the invention is to provide it (sic) with a process for the synthesis of the new derivatives according to the invention.

The synthesis of the above derivatives of formula G, which are liposoluble and which consequently can be called micromolecules, can be carried out by making use of well-known reactions in a homogeneous single phase to the person skilled in phosphorus chemistry (sic). These reactions are set out below in the form of the following equations, where the radicals R, R' and R'' are different from those which are set out in the formula G and where X has the meaning of a halogen atom:

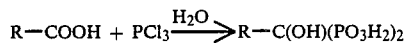

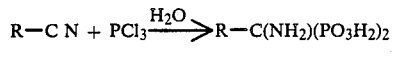

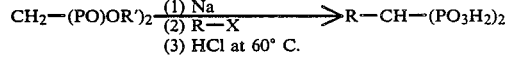

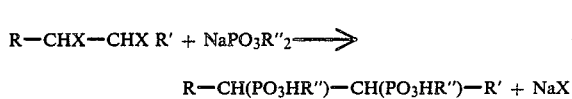

The stoichiometry of these reactions is not obeyed.

Concerning the esterification of the diphosphonated solvents, this can be carried out by the action of the corresponding acyl orthoformate in accordance with an operating procedure identical to that followed for the esterification of carboxylic acids.

All the liposoluble derivatives according to the present invention have been produced by following the methods described above.

When the diphosphonic derivatives are resins, the preferred method of synthesis consists in grafting diphosphonic groups on a resin bearing carboxylic acid functions, which is known per se.

Another method consists in preparing diphosphonic monomers, polymerizing them and crosslinking the polymer obtained to convert it to a resin.

When the grafting method is used, it is possible either to use the reactions indicated earlier which are merely transposed to deal with the resins, or to employ a process which is especially designed with a view to preparing resins according to the invention. In the first case, resins with a low content of phosphorus are generally obtained; in the second case resins are obtained in which the weight proportion of phosphorus is considerable, usually between 10 and 25%, which results in diphosphonic derivatives which are particularly effective with respect to cation exchange.

The invention consequently also relates to a process for the synthesis of diphosphonic resins with a phosphorus weight content of between 10 and 25% by weight (sic).

This process has three essential aspects. The first concerns the degree of dryness of the initial resin. In this respect, it is of utmost importance to dry the resin thoroughly; an azeotropic entrainment of the moisture with benzene is a sufficient method. A still more highly effective method or an additional drying treatment is advantageous, though not essential. The second important aspect of the process is the nature of the solvent employed. The solvent should be inert, will permit a subsequent reaction in a homogeneous medium and should preferably contain ether bridges. The polarity of the solvent is not a crucial factor.

Nevertheless, the use of a solvent whose dielectric constant is between 2 and 10 at 25° C. is advantageous. Similarly, preference is given to solvents whose boiling point is higher than the reaiction (sic) temperature, situated between 90° and 140° C. Solvents with a lower boiling point can, nevertheless, be used, only the reaction is conducted under pressure. Lastly, the third important aspect of the process is the temperature employed: the operation is prefertably (sic) carried out between 90° and 120° C., without exceeding approximately 140° C. It has been found, in fact, that despite the thermal sensitivity of the resins of the type with carboxylic end groups, the use of these temperatures is a highly favorable parameter, not only from the standpoint of kinetics but also from the point of view of the degree of substitution. The ability of the resins to be subjected to several cycles under the abovementioned conditions also appears to be astonishing and is attributed to the choice of the precise conditions which are implemented.

In this manner, any resin containing carboxylic groups, such as acrylic resins or resins containing iminodiacetic groups derived from polystyrene and cross-linked can be modified.

Another objective of the present invention is to provide new compositions capable of permitting the extraction of various metal cations with solvents.

In point of fact, the liposoluble derivatives according to the invention are difficult to dissolve in the hydrocarbon diluents employed conventionally in the industry and especially those which permit a use up to 60°–80° C. and which dissolve well only in certain aromatic hydrocarbons, such as toluene, the toxicity of which is high and/or in relatively flammable polar diluents such as ether and various carboxylic esters.

This is the reason why, in the course of the investigaton which led to the present research, attempts were made to develop diluents capable of dissolving these compounds, the chief constituent of which is a nonaromatic hydrocarbon.

Thus, it has been possible to show that the addition of a water-immiscible polar lipophilic compound in proportions ranging from 1 to 20% enabled the compounds according to the present invention to be dissolved in a satisfactory manner.

These water-immiscible lipophilic polar compounds can be, in particular, alcohols, ketones, phosphoric acid triesters, sulfones, sulfoxides, halogenated derivatives, and trialkylphosphine oxides. They can also be long-chain carboxylic acids such as those which are subjected to hydroxydiphosphonation to produce one of the derivatives according to the invention.

However, it is more practical to use primary, secondary or tertiary alcohols in which the number of carbon atoms is between 5 and 12, and preferably between 6 and 10.

2-Octanol, more frequently referred to as capryl alcohol (sic), and dodecanol, are perfectly suitable, in proportions between 2 and 20%, preferably between 3 and 10%.

It is appropriate to mention here that these water-immiscible lipophilic polar compounds are not devoid of influence on the behavior of the derivatives according to the invention and their extractive power tends to decrease when the concentration of the said polar compound increases, the corresponding selectivity among the various cations also varies. In the case of the solvent extraction of uranium, the said compounds also give rise to an extraction of phosphoric acid, especially when the latter is highly concentrated.

This is the reason why the compositions according to the present invention consist of 0.01 M to 0.2 M solutions of a derivative corresponding to the formula G dissolved in a hydrocarbon diluent, preferably nonaromatic, and in a water-immiscible lipophilic polar compound chosen from the group consisting of alcohols, ketones, phosphoric acid triesters, sulfones, sulfoxides, halogenated derivatives, trialkylphosphine oxides and long-chain carboxylic acids (7 to 30, preferably from 15 to 25, carbon atoms).

The hydrocarbon diluents can be chosen among those sold on an industrial scale by the oil companies. The product sold by the "Esso" company under the name "Exsol D 100" or Escaid 120 can be mentioned in particular.

Concerning the process for the recovery of uranium present in phosphoric acid, in the case where solvents are used it suffices to use the contacting techniques developed in the well-known case of octyl pyrophosphoric acid, better known under its acronym OPPA, the elution being then carried out by contacting with hydrofluoric acid.

However, the extraction techniques are greatly facilitated in the case of the use of the extractants according to the present invention and especially in the case of the diesterified compounds according to the invention. In fact, very few emulsions are observed, even in the presence of fairly high concentrations of ferric iron.

In addition, these compounds are capable of extracting uranium even at very high concentrations of $P_2O_5$, such as that (sic) available commercially at a strength of 50% by weight.

Concerning the re-extraction, it is possible to re-extract by means of sulfuric solutions of iron sulfate. However the kinetics of these re-extractions are slow. In the case of the diesterified compounds, on the other hand, it is possible to re-extract the uranium by means of solutions of sodium and/or ammonium carbonates and of an oxidizing agent capable of oxidizing the tetravalent uranium in the solvent to hexavalent uranium. The said oxidizing agent which can be hydrogen peroxide. (sic) The sodium carbonate concentration can vary between 0.5 and the solubility limit of this carbonate. The same limits are applicable to the other alkali metal or ammonium carbonates.

Concerning the method of basic re-extraction and the solutions capable of re-extracting the uranium present, use can be made of the techniques described and/or mentioned in the French Patent Applications filed by Minemet Recherche under the Nos. 77/25,889, 78/25,815, 79/04,760 and 79/04,761.

In the case where resins are employed, the resin is brought into contact with the uranium-containing phosphoric acid, chemically reduced or otherwise, and then elution is carried out in an oxidizing medium by means of solutions of an alkali metal or ammonium carbonate, at a strength of 10 to 200 grams per liter.

However, due, no doubt, to the presence of hydrogen peroxide, such a re-extraction tends to modify the resin and to reduce the number of active groups within this resin. This is the reason why it is preferable to use other techniques which, furthermore, have the advantage of making it unnecessary to neutralize the impregnating acidity of phosphoric acid. Thus, it has been possible to demonstrate that the resins could be eluted by means of concentrated ferric sulfate solutions in the presence of a small amount of sulfuric acid (0.1 N to 1 N) to avoid the precipitation of this salt.

The products according to the invention, resins or solvents, have excellent extractant qualities for many metals and (sic) for which there were few known extractants in an acidic medium. Among the cations which are readily extracted there may be mentioned all the metals which have an f subshell as well as yttrium and, as a result, the lanthanides and the actinides. They have a relatively high capacity for the alkaline-earth elements and for various tri- or tetravalent transmission (sic) elements. In particular, lead is selectively extracted relative to zinc and to copper, the two latter elements being themselves extracted but at much lower acidities.

The derivatives according to the invention also extract uranium in its hexavalent form, although its partition coefficients are less favorable than for tetravalent uranium, as far as the solvents are concerned, anyway. On the other hand, where the resins according to the invention are concerned, the fixing of hexavalent uranium is excellent, because it is possible to fix significant quantities of hexavalent uranium in the presence of a very large excess of ferric iron. This phenomenon could be due to the fact that the metal ions in the resin can be attached to ligands only once, twice at the very most, while in the liquid phase the cations can be attached to ligands as extensively as necessary.

Purely by way of indication, in the extraction phenomena employing the diesterified liposoluble products according to the invention, tetravalent uranium appears to be attached to two molecules of an extraction agent. In other words, it can be considered as attached to two ligands, while trivalent iron would appear to form a complex involving two ferric ions and three molecules of extraction agent.

The examples which follow, and which are not limiting in any way in their nature, are intended to enable those skilled in the art to determine readily the operating conditions which need to be used in each individual case.

EXAMPLE 1: PREPARATION OF ALKYLMETHYLENEDIPHOSPHONIC ACID

I. Preparation of the Sodium Derivative of the Ester (1a)

The operation is carried out using equimolar quantities of ester and of sodium.

1.6 g of Na are dispersed in 15 ml of anhydrous toluene heated under reflux, with vigorous stirring, in a round flask fitted with a thermometer, a metal stirrer driven by an electric motor, a dropping funnel and a condenser. The dispersion is then cooled to 20° and 24.3 g of isopropyl methylenediphosphonate, 1a, are added via the dropping funnel, while the reaction mixture is maintained between 20° and 30° by means of an acetone/solid carbon dioxide bath until the sodium has disappeared completely.

II. Alkylation of the Sodium Derivative. Preparation of Isopropyl Benzylmethylenediphosphonate, 1b 11 ml of benzyl bromide are added, in situ, to the sodium derivative dissolved in toluene and heated to 100°. Heating is continued for one hour at 60°. The toluene is then evaporated off under water-pump vacuum. 50 ml of technical-grade hexane and 50 ml of water are added. This mixture is transferred to a separating funnel. The organic phase in the hexane is separated from the aqueous phase in 50-ml portions of hexane. The hexane phase is then washed with water until traces of bromo derivatives have disappeared from the aqueous washes (AgNO₃ test). The organic phase is dried over anhydrous sodium sulfate. The solvent is then evaporated off under vacuum.

Distillation of the crude product permits 14.6 g of the expected ester 1b to be collected. The residue left in the round flask (3.4 g) consists of a mixture of benzylmethylenediphosphonic acids (diacids and triacids). Ester 1b alkylation yield=60%. The formation of benzyldiphosphonic acids can be accounted for by the hydrolysis of the ester 1b during the extractions and washings of the organic phase.

III. Hydrolysis of the Ester 1b. Preparation of Benzylmethylenediphosphonic Acid, 2b

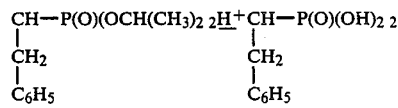

1.5 g of ester 1b and 11 ml of concentrated hydrochloric acid are heated under reflux for 3 hours. The acid and water are then evaporated off under vacuum and 15 ml of isopropyl alcohol are added to the pasty material and distilled off under vacuum to entrain the acidic water. The operation is repeated 3 times. Finally, the crystals are dried in a vacuum desiccator. The yield of acid is quantitative.

The method developed for the synthesis of the ester 1b, of the sodium derivative of the ester 1a and of the acid 2b has been successfully applied to the synthesis of the heptyl, dodecyl, hexadecyl esters of methylenediphosphonic acid and of corresponding acids.

Insofar as the dialkyl ester

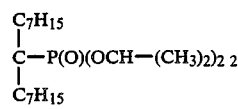

is concerned, this has been readily obtained by us from the sodium derivative of the monoheptyl ester. The dialkylation is effected with a 27% yield.

Hydrolysis of the isopropyl esters of the diphosphonic acids to the corresponding acids takes place easily and with good yields; it is for this reason that these have been chosen.

The analytical method used to monitor these syntheses has been proton NMR spectrography. Routine spectra have been recorded with a Varian E.M. 360 V instrument, using carbon tetrachloride solutions and T.M.S. as an internal reference.

The characteristic signals of the esters are:

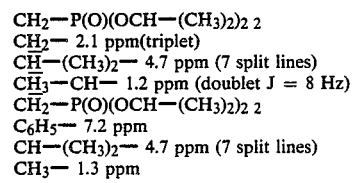

C$\underline{H}_2$— 2.1 ppm(triplet)
C$\underline{H}$—(CH₃)₂— 4.7 ppm (7 split lines)
C$\underline{H}_3$—CH— 1.2 ppm (doublet J = 8 Hz)
C$\underline{H}_2$—P(O)(OCH—(CH₃)₂)₂ 2
C₆H₅— 7.2 ppm
CH—(CH₃)₂— 4.7 ppm (7 split lines)
CH₃— 1.3 ppm

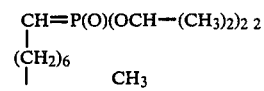

CH₃—(CH₂)₆— 0.9 ppm
CH—(CH₃)₂— 4.65 ppm (7 split lines)
(CH₃)—CH— 1.3 ppm (doublet J = 6 Hz)
and -continued

$CH_3(CH_2)_n$— 0.85 ppm
CH—$(CH_3)_2$— 4.7 ppm (7 split lines)
$(CH_3)$—CH— 1.3 ppm (doublet J = 8 Hz)

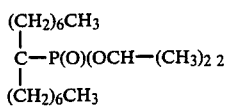

$CH_3$—$(CH_2)_6$— 0.9 ppm
C$\underline{H}$—$(CH_3)_2$— 4.75 ppm (multiplet)
$(C\underline{H}_3)_2$—CH— 1.3 ppm (doublet)

Insofar as the methylenediphosphonic acids are concerned, NMR shows the disappearance of the isopropyl protons, methyl doublet at 1.3 ppm and C$\underline{H}$—CH complex bands at 4.7 ppm, and the appearance of low-field signals due to the acid protons, which makes it possible to control partial or total hydrolysis.

EXAMPLE 3: HYDROXYPHOSPHONIZATION (SIC) OF THE ACID SOLD BY THE SHELL COMPANY UNDER THE NAME OF NAPHTHENIC ACID

Seven molecules (sic) of naphthenic acid per two molecules (sic) of phosphorus chloride ($PCl_3$) are reacted according to the methods described in Belgian Patent No. 619,600. The reaction product is then diluted with kerosene to a concentration of 30% and then the mixture thus obtained is brought into contact with a solution of phosphoric acid with a $P_2O_5$ concentration of 30%, containing 100 mg/liter of uranium. The majority of the uranium is extracted whether the solution is reduced or not.

EXAMPLE 4: ATTEMPT TO DIPHOSPHONATE THE PRODUCT KNOWN UNDER THE NAME OF "TALL OIL"

The method used is as in the preceding example.

EXAMPLE 5: DIESTERIFICATION OF THE PRODUCTS OBTAINED ACCORDING TO EXAMPLES 3 AND 4

These products are mixed with a very large excess (2 times the stoichiometric quantity) of ethyl or methyl orthoformate, depending on the ester which it is intended to produce. During this operation, two groups from the hydroxydiphosphonic acids and the acid group from the tall oil or from the naphthenic acid are esterified. The method follows the conventional organic chemistry techniques for esterification by means of an alkyl orthoformate. Once the reaction has been carried out, the solvents are evaporated off by means of a device generally referred to as a "rotavapor", followed by evacuation by means of a vane pump. As shown by the nuclear magnetic resonance analyses, the residue consists of practically pure diesterified hydroxydiphosphonic products.

The methyl derivative of the naphthenic acid and the ethyl derivative of the product originating from the tall oil were prepared in this manner.

EXAMPLE 6: HYDROXYDIPHOSPHONIZATION (SIC) OF THE RESINS SOLD UNDER THE TRADE NAME C 464 DIAPROSIM

An attempt was made to get rid of the excess water contained in the resin, either by pretreating it with anhydrous dioxane or by using a large excess of $PCl_3$.
Operating procedure:
Resin: 5 ml
Anhydrous dioxane: 50 ml heating for 30 minutes at about 100° C.
Filtration on a sinter, hot. Drying by applying suction for 5 minutes.
Transfer of the dry product to a test tube (sic). Addition of:
  Dioxane: 2 ml
  $PCl_3$: 0.9 ml
Heating in a boiling water bath for 2 hours.
Remixing with $H_2O$, filtration, washing, drying.

Several samples of resin were treated in this manner and the resins obtained were placed in contact with 30% strength phosphoric acid solutions containing 100 mg of uranium in reduced form (90% of iron in the form of $Fe^{2+}$). When normalized to a concentration of one mole of hydroxymethylenediphosphonic group per kilogram of resin, the resin has a coefficient of approximately 80 for partition between the resin phase and the aqueous phase, and the saturation capacity of the order of 70 g/kg of resin.

Furthermore, all the compounds desribed in Examples 1 and 2 have been tested using the same solution and all have shown a very high extractant activity for uranium.

Other tests have demonstrasted the possiblity of extracting other divalent metals besides uranium, especially those in the actinide and lanthanide group.

EXAMPLE 7: EXTRACTION OF ELEMENTS OTHER THAN URANIUM USING THE DERIVATIVE OBTAINED IN EXAMPLE 3.

Composition of the aqueous phases and the form in which the elements have been introduced.

The elements chosen are distributed in two solutions at pH 1, $S_1$ and $S_2$, containing approximately 100 mg/l of each element.

| $S_1$ | $S_2$ |
|---|---|
| Pb—$PbCl_2$ | V—$V_2O_5$ |
| Zn—$ZnCl_2$ | Mo—$MoO_3$ |
| Cu—$CuCl_2$ | In—$InCl_3$ |
| Ni—$NiCl_2$ | Bi—$BiCl_3$ |
| Co—$CoCl_2$ | Sn—$SnCl_2$ |
| Cr—$CrCl_3$ | Tl—$TlCO_3$ |
| Sb—$SbCl_3$ | Ca—$CaCl_2$ |
| Ga—$GaCl_3$ | Cd—$CdCO_3$ |
| La—$LaCl_3$ | Hg—$HgCl_2$ |

|  | Initial $S_1$ | $S_1$ after contact | Initial $S_2$ | $S_2$ after contact |
|---|---|---|---|---|
| Cu | 100 | 50–75 | 100 | 100 |
| Fe | ND | ND | | |
| Ga | 100 | ND | | |
| Zn | 100 | 100 | | |
| Co | 100 | 50 | | |
| Ni | 100 | 75 | | |
| Cr | 100 | 100 | 100 | ND |
| La | 100 | ND | | |
| V | | | 100 | 50 |

-continued

|  | Initial $S_1$ | $S_1$ after contact | Initial $S_2$ | $S_2$ after contact |
|---|---|---|---|---|
| Cd |  |  | 100 | 80–90 |
| In |  |  | 100 | ND |
| Mo |  |  | 100 | ND |
| Tl |  |  | 100 | 50 |
| Hg |  |  | 100 | 100 |
| Sn |  |  | ND | ND |
| Bi |  |  | PT | ND |
| Th |  |  | PT | ND |
| Ca |  |  | 100 | 90–100 |
| Sb | ND | ND |  |  |

PT = possible traces
ND = not detected.

Composition of the Organic Phase diphosphonic derivative 0.1 M in Exsol D100+ octanol, 5% by volume.

Test Conditions and Operating Procedure

The organic phase and the aqueous phase contacts are effected in separating funnels, using:
O/A=1/10
Contact time: 10 min
Ambient temperature.

Results

The elements are determined semi-quantitatively, by X-ray fluorescence, in the aqueous phases before and after contact with the organic phase.

The above table shows the quantity of element present as a percentage relative to the initial solutions (100% base). Note: the virgin organic phase shall (sic) contain traces of copper and of iron (probably some mg/l).

EXAMPLE 8: AN ATTEMPT TO EXTRACT URANIUM IN A PHOSPHORIC MEDIUM BY MEANS OF HYDROXYDIPHOSPHONIC COMPOUNDS ORIGINATING FROM THE REACTION OF PHOSPHORUS TRICHLORIDE WITH TALL OIL

Organic phases containing 0.1 mole per liter of reactant dissolved in the solvent sold by Esso under the trade name Escaid 120, and also containing 5% of added octanol, are brought into contact with solutions of uranium and iron dissolved in phosphoric acid at a $P_2O_5$ concentration of 30%. The iron is introduced in the form of Mohr's salt, and the uranium in the form of uranium IV dissolved in a 1 N solution of sulfuric acid.

The contact time chosen, 30 minutes, is very much longer than that required to attain equilibrium (5 minutes).

The uranium concentration in the original aqueous phase is varied in these experiments.

The first table corresponds to the product derived from tall oil which is unmodified and additionally contains residual tall oil (approximately the same quantity, expressed in moles, as that of the hydroxydiphosphonic reactant) (cf. Example 4). The second table corresponds to the reactant which has been obtained from tall oil and subjected to an esterification reaction, which produces a diethyl ester of the hydroxydiphosphonic acid. This product contains only a little or no residual tall oil (cf. Example 5)

TABLE 1

| Aqueous phase | | | Organic phase | | |
|---|---|---|---|---|---|
| FeII/ total Fe % | U introduced (mg/l) | Equilibrium U (mg/l) | R | Equilibrium U (mg/l) | $K_d$ |
| 100– | 20 | <10 | L8 | 200 | >20 |
| " | 500 | <10 | " | 5000 | >500 |
| " | 1000 | 260 | " | 7400 | 28 |
| 50% | 100 | 50 | " | 500 | 10 |

TABLE 2

| Aqueous phase | | | Organic phase | | |
|---|---|---|---|---|---|
| FeII/ total Fe % | U introduced (mg/l) | Equilibrium U (mg/l) | R | Equilibrium U (mg/l) | $K_d$ |
| 100– | 20 | <10 | L9 | 200 | >20 |
| " | 500 | <10 | " | 5000 | >500 |
| " | 750 | 75 | " | 6860 | 91 |
| " | 1000 | 180 | " | 8200 | 45 |
| " | 2000 | 1470 | " | 8440 | 6 |
| 50% | 100 | 30 | " | 700 | 23 |

EXAMPLE 9: STUDY OF THE EFFECT OF OCTANOL AND OF THE DEGREE OF REDUCTION ON THE EXTRACTION OF URANIUM BY THE DIESTERIZED HYDROXYDIPHOSPHONIC COMPOUND DERIVED FROM TALL OIL

The phosphoric acid used is the same as that described in the preceding example. However, iron was introduced in the form of Mohr's salt and of ferric sulfate, this being done in such a way that the quantity of total dissolved iron should remain constant and in such a way as to obtain the degree of reduction specified in the tables which follow.

The first table corresponds to the use of a solvent containing 0.1 M of the diesterified diphosphonic compound. The second table corresponds to a concentration of 0.05 M of the same compound.

The octanol content of the orgainic phase was varied.

TABLE 1

| FeII Fe tot. % | Oc- tanol % | Aqueous phase $U_A$ (mg/l) | Organic phase | | | | |
|---|---|---|---|---|---|---|---|
| | | | $U_O$ (mg/l) | $Fe_O$ (mg/l) | P (g/l) | $K_dU$ | S U/Fe |
| 90 | 5 | 265 | 6530 | 680 | 7.19 | 24.6 | 54 |
| 80 | 5 | 325 | 5890 | 930 | 6.94 | 18.1 | 58 |
| 100– | 15 | 205 | 6900 | 190 | 6.84 | 33.7 | — |
| 90 | 15 | 280 | 6250 | 500 | 6.84 | 22.3 | 67 |
| 80 | 15 | 315 | 5800 | 660 | 6.84 | 18.4 | 84 |

TABLE 2

| FeII Fe tot. % | Octanol % | Aqueous phase $U_A$ (mg/l) | Organic phase | | | | |
|---|---|---|---|---|---|---|---|
| | | | $U_O$ (mg/l) | $Fe_O$ (mg/l) | P (g/l) | $K_dU$ | S U/Fe |
| 90 | 5 | 160 | 2980 | 350 | 3.21 | 18.6 | 80 |
| 80 | 5 | 190 | 2680 | 450 | 3.21 | 14.1 | 94 |
| 100– | 15 | 125 | 3390 | 110 | 3.49 | 27.1 | — |
| 90 | 15 | 165 | 3040 | 290 | 3.46 | 18.4 | 95 |
| 80 | 15 | 180 | 2740 | 381 | 3.51 | 15.2 | 120 |

$K_dU = U_O/U_A$ partition coefficient
S U/Fe = coefficient of selectivity for uranium relative to iron:
$\overline{U_A/Fe_A}$
$\overline{U_O/Fe_O}$

EXAMPLE 10: TEST FOR THE SOLUBILITY OF THE SOLVENTS DERIVED FROM TALL OIL

The organic phases containing 0.1 M of the derivatives obtained from tall oil, diethylated or otherwise, which phases are modified, were brought into contact with aqueous phases consisting of 30% strength phosphoric acid, the ratio of the two phases being equal to 1.

The results show a loss of less than 1/3000th for both solvents.

EXAMPLE 11: ATTEMPT TO RE-EXTRACT THE URANIUM PRESENT IN THE ORGANIC PAHSES, USING HYDROFLUORIC ACID

An organic phase containing 0.05 M of the diphosphonic compound derived from tall oil and diesterified, containing 4.2 grams per liter of uranium is brought into contact with various quantities of 50% strength hydrofluoric acid. With an O/A of 40, 80% of the uranium is already precipitated in the form of its tetrafluoride. With an O/A of 3, 99% of the uranium is recovered.

These results should be improved if the organic phase was washed, for example with concentrated sulfuric acid, to free it from the dissolved phosphoric acid, before the re-extraction was carried out.

The organic phase regenerated in this way was again brought into contact with an aqueous phase containing 30% of phosphoric acid and 15 grams per liter of completely reduced iron. The concentration obtained after one contact makes it possible to attain saturation and to conclude that the extractant characteristics of the diphosphonated product have remained unaltered despite more than a day's contact with 50% strength hydrofluoric acid.

EXAMPLE 12: COMPARATIVE TEST ON ESTERIFIED AND UNESTERIFIED PRODUCTS

Phosphoric acid solutions at a $P_2O_5$ concentration of 30% are brought into contact with an organic phase containing naphthenic acid after hydroxydiphosphonation and the product originating from the esterification of the first product. The concentrations are shown in the following table, together with the extraction results.

|  | Unesterified derivative | | | Esterified derivative | | |
| --- | --- | --- | --- | --- | --- | --- |
|  | U g/l | Fe g/l | P g/l | U g/l | Fe g/l | P g/l |
| Initial aqueous phase | 0.15 | 14.2 | — | 0.15 | 14.2 | — |
| Virgin organic phase |  |  | 3.67 |  |  | 2.70 |
| Concentrated organic phase | 1.30 | 1.01 | 3.38 | 1.03 | 0.55 | 2.70 |
| Spent organic phase | <50 mg/l | 14.2 |  | <50 mg/l | 14.5 | — |

EXAMPLE 13: ATTEMPT TO FIX URANIUM BY PERCOLATION THROUGH A BED OF RESIN

A resin prepared as described in Example 6, containing 9% of phosphorus by weight, after acid/base conditioning cycles, is placed in a column and a solution of phosphoric acid at a $P_2O_5$ concentration of 30%, having the following composition: total Fe 2 g/l, degree of Fe reduction 50%, uranium content *(at 124 mg/l is percolated at a rate of 6 bv (resin bed volume per hour). The resin is then rinsed counter-currentwise and is finally eluted in the flow direction with a solution containing 100 g/l of ferric sulfate at a rate of one bv per hour.

All these operations are carried out at a temperature of 60° C.

During the first 20 bv there is no analytically detectable trace of uranium. The uranium content of the phosphoric solution then increases slowly after percolation.

Once the initial concentration has been reached (approximately 120 bv), the total quantity of fixed uranium is calculated, and is approximately 10 g/l.

After the percolation, elution enables 95% of the fixed uranium to be recovered.

However, the eluate content does not exceed 0.7 g/l, owing, no doubt, to the slowness of the exchange between the resin and the solution and the slowness of effecting the oxidation of uranium IV to uranium VI.

EXAMPLE 14: ATTEMPT TO FIX URANIUM AT DIFFERENT $P_2O_5$ CONCENTRATIONS AND AT DIFFERENT DEGREES OF OXIDATION

These tests were carried out on the resin maufactured as described in Example No. 15

2 ml of swollen resin, which has been subjected to acid/base activation and conditioning cycles, are placed in beakers in contact with 40 ml of a phosphoric acid solution containing uranium and iron in an oxidation state specified in the following table

|  | STATE OF THE CATIONS | | | | | |
| --- | --- | --- | --- | --- | --- | --- |
|  | Fe | U | U mg/l | Fe g/l | $SO_4$ g/l | $P_2O_5$ g/l |
| S.I. | $Fe^{II}$ | $U^{IV}$ | 410 |  |  |  |
| S.F. | $Fe^{II}$ | $U^{IV}$ | 100 |  |  |  |
| S.I. | $Fe^{II}$ | $U^{IV}$ | 505 | 24.1 | 77.8 | 632 |
| S.F. | $Fe^{II}$ | $U^{IV}$ | 190 | 23.3 | 78.5 | 635 |
| S.I. | $Fe^{III}$ | $U^{VI}$ | 405 |  |  |  |
| S.F. | $Fe^{III}$ | $U^{VI}$ | 240 |  |  |  |
| S.I. | $Fe^{III}$ | $U^{VI}$ | 495 | 26.7 | 99.0 | 694 |
| S.F. | $Fe^{III}$ | $U^{VI}$ | 380 | 26.7 | 101. | 713 |

EXAMPLE 15: EXAMPLE OF SYNTHESIS 50 g of Duolite CS 466 resin, marketed by the "Diaprosim" Company, which are placed in a column, are converted to acid form by percolation with 2 liters of 1 N hydrochloric acid. The resin is rinsed abundantly by azeotropic entrainment with benzene. 30 g of dry resin are swollen with 250 ml of dioxane. 11.2 ml of water (i.e. 0.63 mole) were then poured onto the swollen resin, with stirring, followed, slowly, by 34 ml of $PCl_3$ (i.e. 0.4 mole). The temperature was raised to 95° C. and the medium was maintained under these conditions for 3 hours. At the end of this time the mixture was allowed to cool to approximately 60° C. and 11.2 ml of water and 34 ml of $PCl_3$ were added again, and then heating was continued for 3 hours at 95° C. A sample of the resin obtained was taken, washed with demineralized water and dried by azeiotropic distillation with benzene. This resin already had a phosphorous content of 10% by weight. The above cycle was repeated 2 times with the remainder of the mixture, after which, after rinsing and drying as indicated earlier, 42 g of resin showing a phosphorus content of 16.5% by weight, were obtained in the form of hydroxydiphosphonic sites.

The starting resin is a ploystyrene-type resin bearing iminodiacetic groups and crosslinked by means of divinylbenzene.

EXAMPLE 16: ATTEMPT TO EXTRACT VARIOUS ELEMENTS BY MEANS OF A HYDROXYDIPHOSPHONATED RESIN AND SOLVENT AFTER HYDROXYDIPHOSPHONATION AND DIESTERIFICATION OF TALL OIL

| Element Sol A.H+ = 0.3 N | Element Sol B/H+2N | EXTRACTION EFFICIENCY | | |
|---|---|---|---|---|
| | | Resin | L8 0.1 M | L9 0.1 M |
| V(IV) | | 100% | 100% | 100% |
| MnII | | 50% | 100% | 100% |
| Co(II) | | ≃0 | ≃50% | ≃50% |
| Ni(II) | | ≃0 | ≃0 | ≃0 |
| Cu(II) | | 50% | 75% | 75% |
| Zn(II) | | 10 to 15% | 40% | 60% |
| Ga(III) | | 100% | 100% | 100% |
| Ge(II) | | 85% | 100% | 100% |
| Cd(II) | | 50% | ≃50% | 50% |
| In(III) | | 100% | 100% | 100% |
| | Mo(VI) | | 100% | 100% |
| | Hg(II) | | 90%* | 30% |
| | Pb(II) | | 100% | 100% |
| | Bi(III) | | 100% | 100% |

*DOUBTFUL
Resin = resin of Example 15 after diphosphonation
L8 = hydroxydiphosphonic acid derived from tall oil
L9 = diethyl ester of L8
L8 and L9 are dissolved in Escaid 120 containing 5% of octanol

We claim:

1. A water insoluble ion exchange resin having a crosslinked, three-dimensional resin skeleton and an active group of the formula:

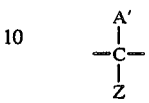

wherein
R is selected from the group consisting of hydrogen and an alkyl radical having 1–15 carbon atoms and having at most two branchings in the alkyl group, and
A is a mono-, di-, or tri-substituted ethylene radical or mono- or di-substituted methylene radical, wherein the substitutents are selected from the group consisting of an alkyl group having at most two branchings, hydroxy, an amino group and hydrogen and wherein A provides a link binding the active group to the resin skeleton.

2. The resin of claim 1, wherein R is hydrogen.

3. The resin of claim 1, wherein the resin skeleton is selected from the group consisting of crosslinked acrylic and polystryrene resins.

4. A resin according to claim 1, in which A is:

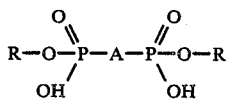

Z is selected from the group consisting of alkyl radicals having 1–30 carbon atoms and having at most two branchings, an amino group, hydroxy and hydrogen, and A' provides a link binding the active group to the resin skeleton.

5. The resin of claim 4, wherein the weight of phosphorous to weight of resin skeleton is between 10 and 25 percent.

6. A process for synthesizing the ion exchange resin of claim 1, comprising the steps of:
   (1) acidifying resin carrying carboxylic acid groups using a mineral acid,
   (2) rinsing the acidified resin to eliminate the mineral acid,
   (3) drying the resin to a point of dryness which is at least equal to that obtained by using a benzene azeotrope,
   (4) soaking hte dried resin in an inert solvent which is capable of dissolving at least 3 percent of its volume of water and at least 8 percent of its volume of phosphorus trichloride,
   (5) adding to the soaked resin water and phosphorus trichloride in an amount between 5 and 50% of the volume of the soaked resin at a rate of 1 to 2.5 moles of water per mole of phosphorus trichloride,
   (6) heating the resin to between 90° and 140° C. and maintaining that temperature from 0.5 to 10 hours,
   (7) lowering the temperature to between 20° and 80° C., and
   (8) rinsing the resin with water and drying.

7. The process of claim 6, and further comprising after step (7) repeating the steps (5) and (6).

8. The process of claim 1, wherein the inert solvent is selected from the group consisting of dioxane and tetrahydrofurane.

9. The process of claim 7, and further comprising esterifying the resin.